UNITED STATES PATENT OFFICE.

WILLIAM R. WALKER, OF NEW YORK, N. Y.

MANUFACTURE OF STEEL.

1,086,003.  Specification of Letters Patent.  Patented Feb. 3, 1914.

No Drawing.   Application filed May 4, 1911.   Serial No. 625,061.

*To all whom it may concern:*

Be it known that I, WILLIAM R. WALKER, a citizen of the United States, and a resident of the borough of Manhattan, city, county, and State of New York, have invented certain new and useful Improvements in the Manufacture of Steel, of which the following is a specification.

This invention relates to the use of electric furnaces in the manufacture of steel.

The principal purpose of the invention is to provide a cheap and rapid process for making steel of good quality from iron which may be classified as to its phosphorus content between the grades commonly known as basic Bessemer iron and acid Bessemer iron. Basic Bessemer iron is that which is commonly blown in Bessemer converters with basic lining and slag, and is roughly from 1.80 per cent. to 2.20 per cent. or even a little higher in phosphorus. Acid Bessemer iron is that which is ordinarily treated in Bessemer converters with acid lining and slag and contains under 0.12 per cent. of phosphorus, ordinarily between 0.05 per cent. and 0.10 per cent. Iron which in phosphorus content is between these two classes usually contains too little phosphorus for use in the basic Bessemer converter, and contains too much phosphorus to make it available in the acid converter, it is, therefore, treated in the basic open-hearth where, by the necessary additions, its content of phosphorus can be reduced to practically any desired point. The present process is designed especially to facilitate the making of steel from this intermediate grade of iron, and is at the same time adapted for use with iron of lower phosphorus content.

A process embodying the invention is as follows: Iron of the stated phosphorus content is first partially blown in the acid converters sufficient to remove the silicon and a portion of the carbon. The iron in question has sufficient heat-giving elements for this partial blow. The iron is only slightly oxidized by this partial blow. The partially blown metal is then transferred, ordinarily by means of a ladle, to an intermediate mixer in the form of a basic open-hearth furnace of sufficient capacity to bring about substantial uniformity in the products of the several converters and to carry always a supply of hot metal for the subsequent treatment in the electric furnaces hereinafter referred to. The mixer is basic lined, is heated by gas and air with the aid of regenerators in the well-known manner of open-hearths and is supplied with a basic slag of iron ore and lime, or the like, to reduce the phosphorus content to the point desired in the final product. In this operation a portion of any sulfur present is incidentally removed and there is a further oxidation of the iron present.

From time to time portions of the metal in the intermediate mixer are transferred to electric furnaces. The use of the said mixer provides a supply of molten metal always ready for the electric furnaces so that immediately after pouring a finished charge therefrom a new charge may be introduced. As the electric furnace is without heating means when empty, and cools very rapidly, and the cost of heating it is considerable the saving of time between heats is of substantial importance. In the electric furnaces a non-oxidizing atmosphere is maintained. These furnaces for example may be of the Heroult arc type. By reason of the previous operations upon the metal an acid lining may be used for the electric furnaces, which means a substantial saving in expense, both first cost and repairs and other operating costs, and a more rapid operation or larger tonnage per day than could be obtained with a basic lining. The treatment in the electric furnace is referred to in more detail hereinafter.

The metal from the electric furnaces is transferred to a final mixer which may be a ladle of large capacity with an acid lining and with or without electrodes or other heating means. A substantial quantity of molten metal is maintained in this final mixer so as to obtain a product substantially uniform in carbon and other ingredients. The refined steel produced in this final mixer is then cast either directly therefrom or by transferring it first to a more convenient smaller casting ladle.

Subsequently to the dephosphorization of the metal in the intermediate mixer, that is to say either in the electric furnace or in the final mixer, or partly in one and partly in the other, deoxidizing additions are made to the metal. By reason of the high temperature and non-oxidizing atmosphere in the electric furnace and the quiescent state of the metal in the final mixer the treatment in these vessels serves to highly refine the steel and eliminate the microscopic slag which is ordinarily widely and finely diffused and difficult of removal.

The deoxidizing or reducing additions may be manganese, aluminum, silicon and the like, including additions like vanadium and chromium which produce what is ordinarily called alloy steel. Ordinarily the addition of manganese, and aluminum, will be sufficient for deoxidizing. By elimination of slag and other elements I mean to include partial as well as complete elimination.

In my Patent No. 934,247 of September 14th, 1909, I have described a process of treating iron first in an acid Bessemer converter and then dephosphorizing in a basic electric furnace. The electric furnace is an expensive apparatus to operate and the use of a basic furnace to dephosphorize is so slow that the tonnage produced is comparatively small and the expense of operation correspondingly large. The present process by using the expensive electric furnace only for the deoxidizing of the metal effects a very large saving in the cost of the electric furnace and its operation, a saving much greater than the cost of dephosphorizing in the intermediate mixer. The intermediate mixer has the advantage above explained of providing metal for a nearly continuous use of the electric furnace; and while the metal is held in this intermediate mixer it is a matter of comparatively small expense to dephosphorize it. There is, therefore, double economy in this combination of steps. The three operations, removal of silicon, removal of phosphorus and final deoxidization and refinement are performed in separate stages and each in the manner which can be most economically employed for that particular operation. Also this arrangement of steps permits the various operations to be carried on with very much less attention than is necessary in ordinary methods. For example, no substantial harm is done if the operation in the converter be carried on for a longer or shorter period, or if the dephosphorizing in the intermediate mixer or the deoxidization in the electric furnaces be carried somewhat beyond the intended points. By carrying out the last degree of refinement in the final mixer the time of using the electric furnace is curtailed for each melt, the large quantity of residual heat in the metal being used in the final mixer, so that the metal occupies the electric furnace only for the time absolutely necessary to bring it to the highest temperature. Or, if the electric furnace be used for a longer period, as is the common practice in the electric furnace processes generally, then the subsequent dead melt or deoxidization in the final mixer serves to carry the product to a higher degree of refinement than where it is cast directly from the electric furnace. The temperature drops somewhat in the final mixer, which is rather an advantage than otherwise, the lower temperature being a better one for teeming into the ingot or other molds.

The invention contemplates not only the complete succession of steps, and the specific steps above described in detail, but also combinations of less than all the steps described and the carrying out of the several steps of the process in ways differing specifically from those above described, as will be clear from the claims hereinafter.

The character of a suitable plant for carrying out the process is indicated generally in the above description of the process sufficiently to enable a person skilled in the art to practise the invention. It may be added, however, that a suitable plant would consist of converters of 13 tons capacity, intermediate mixers of 125 tons, electric furnaces of 25 tons, these apparatus being fixed except for the tilting movements necessary in charging and pouring from them, final mixing ladles of 100 tons capacity carried by suitable cranes, and the usual small ladles, apparatus for charging additions and slag-forming materials, and the like. My application No. 623,908 pending concurrently herewith illustrates the arrangement of such apparatus. Said application also contains claims broadly including the use of converters, intermediate mixers, electric furnaces and final mixers in various combinations, the present application being specific thereto and based upon the use of acid converters and acid electric furnaces having special applicability to the class of iron above referred to.

What I claim is:

1. In the manufacture of steel from iron having a phosphorus content below that of basic Bessemer iron the process which consists in partially blowing the same in acid converters to remove the silicon and a portion of the carbon, in which operation the iron is slightly oxidized, transferring the partially blown metal from said converters to an intermediate basic open-hearth mixer and treating it therein with a basic slag of iron ore and lime or the like to reduce the phosphorus content to the point desired in the final product, in which operation a portion of any sulfur present is also removed and more oxid of iron is introduced, maintaining a substantial supply of molten metal in said intermediate mixer and transferring metal therefrom from time to time to acid electric furnaces, maintaining a substantially non-oxidizing atmosphere in said furnaces, transferring the metal from said furnaces to a final acid mixer, maintaining a substantial quantity of molten metal in said mixer so as to obtain a product substantially uniform in carbon and other ingredients, introducing deoxidizing additions at a stage of the process subsequent to the dephosphorization, the treatment in the electric furnaces and in the final mixer serving to refine the steel and to eliminate microscopic slag, and casting the refined steel produced in the final mixer.

2. In the manufacture of steel from iron having a phosphorus content below that of basic Bessemer iron, the process which consists in partially blowing the same in acid converters, treating the partially blown metal from said converters in an intermediate mixer with a basic slag to reduce the phosphorus content to the point desired in the final product, taking metal from said mixer from time to time to acid electric furnaces and treating it therein, and transferring the metal from said electric furnaces to a mixer where it undergoes refinement and elimination of microscopic slag and the steel is maintained substantially uniform in carbon and other ingredients and casting such steel.

3. In the manufacture of steel from iron having a phosphorus content below that of basic Bessemer iron, the process which consists in partially blowing the same in an acid converter, treating the partially blown metal from said converter in an intermediate mixer with a basic slag to reduce the phosphorus content to the point desired in the final product, taking metal from said mixer from time to time to an acid electric furnace and deoxidizing it therein.

4. In the manufacture of steel from iron having a phosphorus content below that of basic Bessemer iron, the process which consists in blowing the same in an acid converter to eliminate silicon and carbon, subsequently reducing the phosphorus content to the point desired in the final product and thereafter deoxidizing in an acid electric furnace the previously dephosphorized metal.

5. In the manufacture of steel the process which consists in eliminating silicon and carbon in an acid converter, subsequently reducing the phosphorus content to the point desired in the final product and thereafter deoxidizing in an acid electric furnace.

In witness whereof, I have hereunto signed my name in the presence of two subscribing witnesses.

WILLIAM R. WALKER.

Witnesses:
D. ANTHONY USINA,
H. CLAY REIMER.